March 15, 1932.                J. ERLANGER                 1,849,451
                         EARTHWORKING IMPLEMENT
                           Filed Nov. 11, 1930
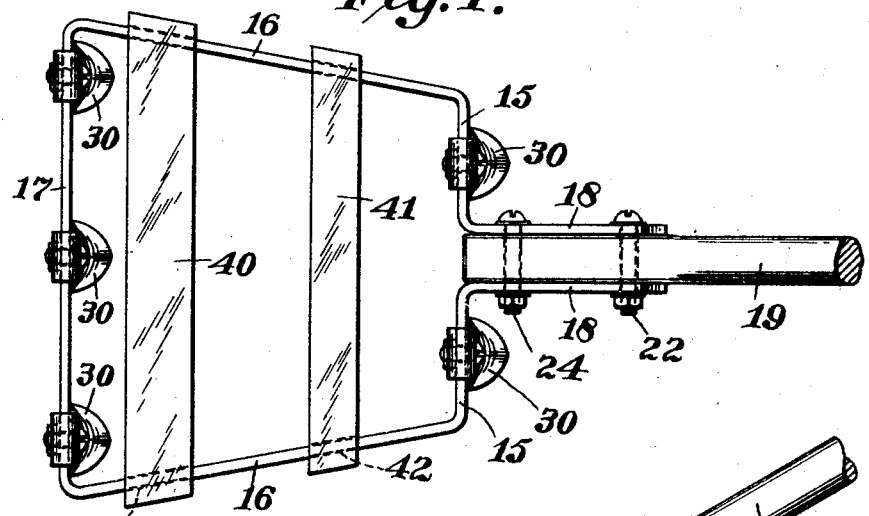
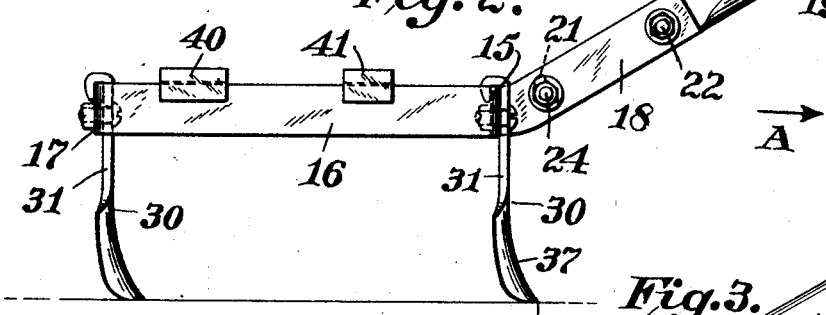
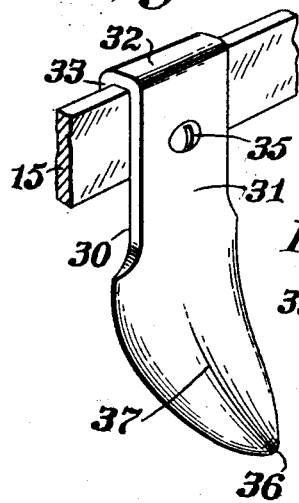
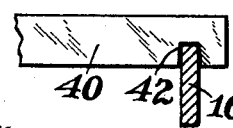
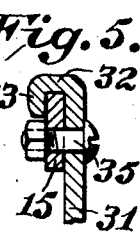
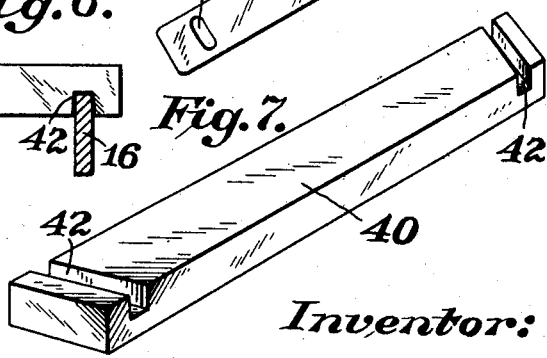
Inventor:
Jacques Erlanger,
By Harvee & Harvee
Attys.

Patented Mar. 15, 1932　　　　　　　　　　　　　　　　　　1,849,451

UNITED STATES PATENT OFFICE

JACQUES ERLANGER, OF LIVERMORE, PENNSYLVANIA, ASSIGNOR TO E. E. RALSTON, OF LIVERMORE, PENNSYLVANIA

EARTHWORKING IMPLEMENT

Application filed November 11, 1930. Serial No. 494,991.

The object of this invention is to provide a hand drawn earth-working implement, capable of use as a harrow, cultivator or weeder, and one which will float over the soil and take care of itself without requiring the operator to do more than draw it over the soil and to adjust the frame weights according to the working condition of the soil.

In the accompanying drawings which form part of this specification,

Fig. 1 is a top plan of the implement, with part of the handle broken off,

Fig. 2 is a view thereof in side elevation,

Fig. 3 is a view in side elevation of one end of the handle,

Fig. 4 is a perspective view of one of the teeth,

Fig. 5 is a vertical sectional view through the upper part of Fig. 4.

Fig. 6 is a detail of fragments of a weight and side bar, and

Fig. 7 is a perspective view of a weight inverted.

Referring to the drawings, reference numeral 15 designates the front bars, 16 the side bars, 17 the rear bar, and 18 the draft bars of the main frame. The front and rear bars 15 and 17 respectively are parallel with each other, though the rear bar 17 is longer than the combined lengths of the front bars 15, and this causes the side bars 16 to converge forwardly. The draft bars 18 are parallel and both are bent upwardly and loosely receive a handle 19.

The handle is provided with a hole 20 and an arcuate slot 21 through which bolts 22 and 24 respectively pass. The draft bars 18 are not clamped tightly upon the handle, but engage the handle without sufficient pressure to interfere with the free vertical swinging of the handle upon the bolt 22 during the use of the implement. The arcuate slot 21 normally permits a certain amount of free swinging movement, and where a greater amount is desired, the bolt 22 may be entirely removed, and in other cases it may be put in place with the lower end of the handle 19 entirely above or below the same. This permits the implement to float on the soil unhampered by any vertical positioning of the handle.

Three earth working teeth 30 are attached to the rear bar 17 and two similar teeth to the front bar 15, (one to each) and the front teeth alternate with the rear teeth. Obviously the front and rear bars may be made longer to accommodate a greater number of teeth, but in any event, the front and rear teeth alternate, so the furrows produced by the front teeth pass between those formed by the rear teeth.

These teeth are replaceable, for repair or other purposes, and consist of flat strip shanks 31 which engage the front faces of the bars 15 and 17, and bend over the upper edges of said bars as at 32 and down the rear faces of the bars for a short distance, as at 33, in hook-like formation. Nutted bolts 35 removably secure the teeth in place and the close engagement of the parts 31, 32 and 33 with the bars 15 and 17 prevents the teeth from undesired movement on the said bars.

The teeth bend forwardly to their points 36 and slope rearwardly from a medial line 37. This causes the teeth to very readily enter the soil and further causes the loosened earth to pass to both sides of each tooth.

In certain soils, the weight of the implement, as included in the foregoing description, is not sufficient to cause the teeth to properly enter the soil, and it becomes necessary to weigh the frame. Bar weights 40 and 41 are applied to the front and rear parts of the implement frame, the rear weight 40 being heavier than the front weight 41. Either or both of these weights are used, according to the nature of the soil to be worked, and the means of attaching these weights to prevent their displacement under working conditions is an important feature. Forwardly converging slots 42 are provided in the under faces of the bars and these slots being of the same convergence as the side bars 16, properly receive the same. Moreover, the convergence of the frame side bars 16 and the slots 42 prevent shifting of the bars in any horizontal direction, and the wedging action that takes care of this, also acts to prevent to a degree any vertical displacement.

In use, the implement is pulled over the ground by hand in the direction of the arrow A in Fig. 2. The forward pitch and shape of the teeth cause them to readily enter the ground, after which the implement can be worked with comparative ease through quite heavy soils, serving as a harrow, cultivator or weeder, and in many cases taking the place of horse or power drawn implements. The handle may be held in almost any vertical position convenient to the operator and the floating action of the implement proper will cause it to take care of itself and to properly work the soil without the operator doing more than to draw it over the soil and to adjust the weights according to working conditions of the soil.

It will be observed that the entire tooth-carrying frame, while it floats independently of the handle, may be raised from the ground by means of the handle.

What is claimed:—

In a manu-motive device of the character described, a handle, and an earth-working implement connected thereto and adapted to float independently thereof and adapted to be lifted free of the ground by said handle, said frame having front and rear earth-working teeth and converging side bars, and a weight having converging grooves in the under side thereof detachably receiving said side bars.

In testimony whereof I affix my signature.

JACQUES ERLANGER.